(12) United States Patent
Leppard

(10) Patent No.: US 8,442,942 B2
(45) Date of Patent: May 14, 2013

(54) COMBINING HASH-BASED DUPLICATION WITH SUB-BLOCK DIFFERENCING TO DEDUPLICATE DATA

(76) Inventor: Andrew C. Leppard, Unley (AU)

( * ) Notice: Subject to any disclaimer, the term of this patent is extended or adjusted under 35 U.S.C. 154(b) by 293 days.

(21) Appl. No.: 12/731,590

(22) Filed: Mar. 25, 2010

(65) Prior Publication Data

US 2011/0238635 A1    Sep. 29, 2011

(51) Int. Cl.
*G06F 7/04*    (2006.01)
*G06F 17/30*    (2006.01)

(52) U.S. Cl.
USPC ............ 707/616; 707/692; 707/698; 707/747

(58) Field of Classification Search ............... 707/999.1, 707/999.101, 999.102, 999.206, 616, 692, 707/698, 747; 711/216
See application file for complete search history.

(56) References Cited

U.S. PATENT DOCUMENTS

| | | | |
|---|---|---|---|
| 5,990,810 A * | 11/1999 | Williams | 341/51 |
| 8,171,004 B1 * | 5/2012 | Kaminski, Jr. | 707/698 |
| 2006/0282457 A1 | 12/2006 | Williams | |
| 2007/0192548 A1 | 8/2007 | Williams | |
| 2007/0208788 A1 | 9/2007 | Chakravarty et al. | |
| 2008/0243879 A1 | 10/2008 | Gokhale et al. | |
| 2009/0228534 A1 * | 9/2009 | Hirsch et al. | 707/204 |
| 2011/0099351 A1 * | 4/2011 | Condict | 711/216 |
| 2012/0203748 A1 * | 8/2012 | Kaminski, Jr. | 707/698 |

OTHER PUBLICATIONS

Patent Cooperation Treaty (PCT), International Search Report and Written Opinion from co-pending PCT International Patent Application No. PCT/US2011/028761 (International Filing Date Mar. 17, 2011) having a date of mailing of May 23, 2011, 6 pages.
"DXi-Series Disk Backup Systems with Data De-Duplication: Providing Comprehensive Data and System Integrity", *Quantum Technical Brief*, www.quantum.com.
Manber, U., "Finding Similar Files in a Large File System," Department of Computer Science, University of Arizona, Oct. 1993.
Manber, U., "Finding Similar Files in a Large File System," Technical Paper presented at USENIX Winter 1994 Technical Conference Proceedings Jan. 17-21, 1994, http://www.usenix.org/publications/library/proceedings/sf94/index.html, Jan. 1994.
PCT International Preliminary Report On Patentability, Oct. 4, 2012.

\* cited by examiner

*Primary Examiner* — Bruce Moser

(57) ABSTRACT

In one embodiment, a method includes accessing data; partitioning the data into sub-blocks; determining whether a first one of the sub-blocks is identical to another one of the sub-blocks or similar to another one of the sub-blocks; if the first one of the sub-blocks is identical to another one of the sub-blocks, applying by the one or more computer systems hash-based deduplication to storage of the first one of the sub-blocks with respect to the other one of the sub-blocks; and, if the first one of the sub-blocks is similar to another one of the sub-blocks, applying by the one or more computer systems sub-block differencing to storage of the first one of the sub-blocks with respect to the other one of the sub-blocks.

6 Claims, 3 Drawing Sheets

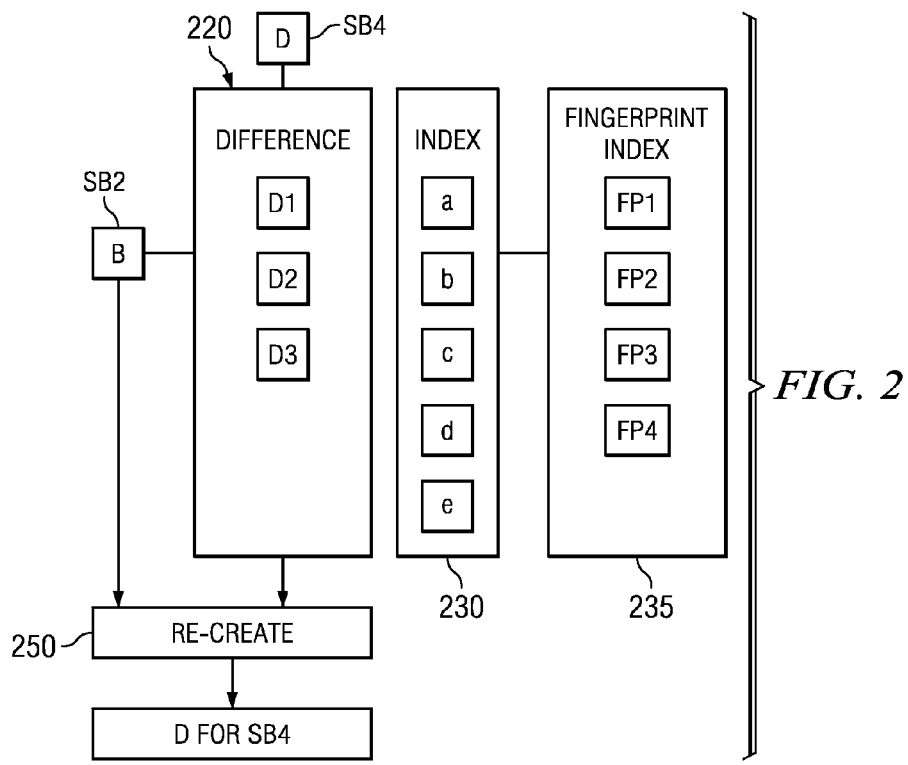
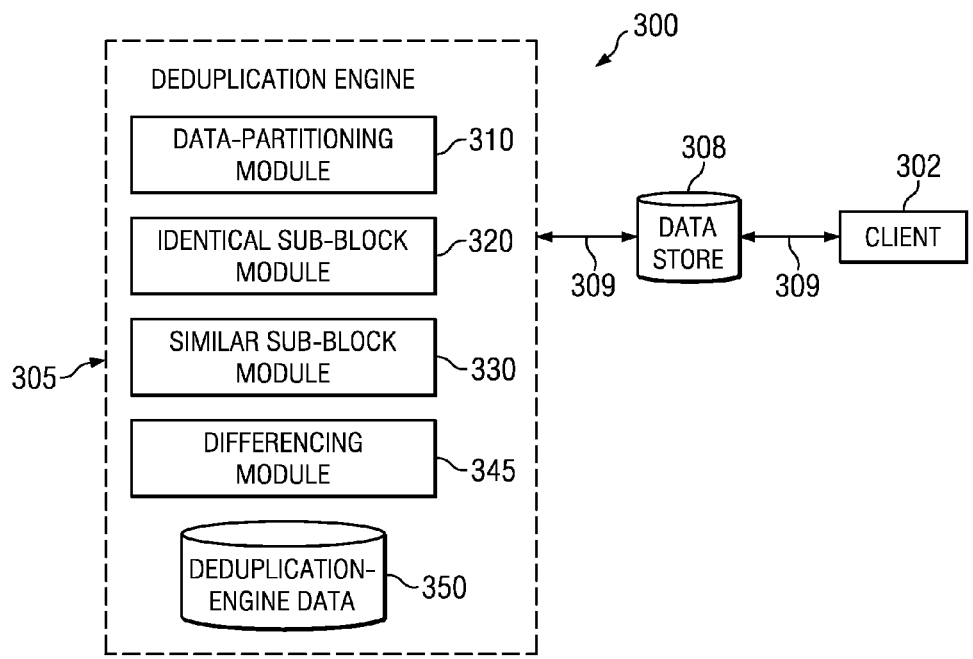

COMBINING HASH-BASED DUPLICATION WITH SUB-BLOCK DIFFERENCING TO DEDUPLICATE DATA

TECHNICAL FIELD

This disclosure relates generally to deduplicating data.

BACKGROUND

Data deduplication reduces the amount of data storage required to represent and retain data. Data deduplication typically works by identifying duplicate portions of data being stored and replacing those duplicate portions with pointers to existing stored copies of that data, requiring a unique sequence of data to be stored only once.

BRIEF DESCRIPTION OF THE DRAWINGS

FIG. 2 illustrates an example combination of hash-based duplication with sub-block differencing to deduplicate data.

FIG. 3 illustrates an example system for deduplicating data that combines hash-based duplication with sub-block differencing.

DESCRIPTION OF EXAMPLE EMBODIMENTS

Figure 1:
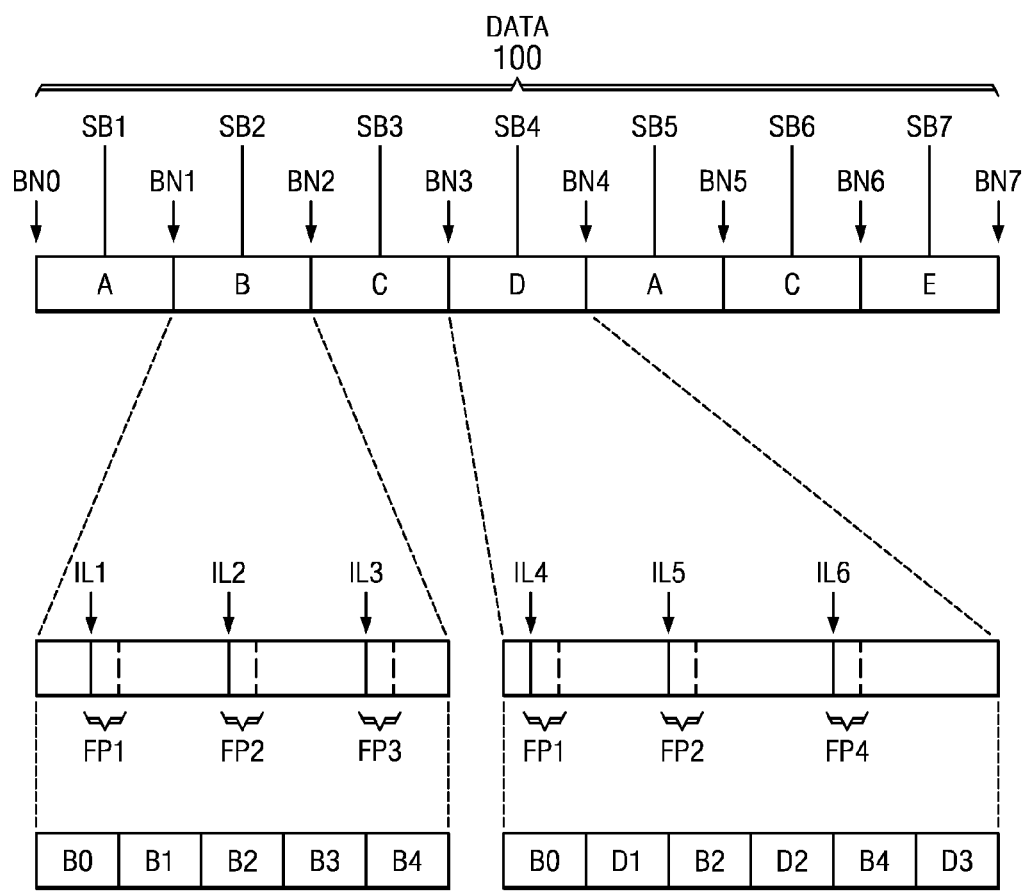
FIG. 1 illustrates an example partitioning of data into sub-blocks.

A deduplication engine may use a data structure known as a primary index to store signature values (such as hash values) that are associated with sequences of data being stored. These sequences of data (known as sub-blocks) may be smaller portions of a larger file or data stream. Copies of unique sub-blocks may be stored in a repository, which may reside on a hard disk drive (HDD), in a storage area network (SAN), or in other mass storage. The deduplication engine may use the primary index to store a pointer to an address (or location) in the repository to point from the signature of a sub-block to the actual storage location of the sub-block associated with it. Herein, reference to a signature encompasses a signature value, and vice versa, where appropriate. Herein, reference to a deduplication engine encompasses a hardware or software element (such as, for example, a computer program) or a combination of two or more such elements that algorithmically perform data deduplication, where appropriate. This disclosure contemplates any suitable programming language for any suitable computer program for data deduplication, where appropriate. This disclosure contemplates any suitable number and type of computer systems executing any suitable computer program for data deduplication, where appropriate. Each of the computer systems may be unitary or distributed, where appropriate, and a distributed computer system may span multiple computer systems or multiple datacenters, where appropriate.

In data deduplication, access to the primary index often presents a bottleneck. This bottleneck may exist because random data access is slower than sequential data access. Content-driven lookups (such as searching for a signature of a sub-block in a primary index) are inherently random processes, and the relative slowness of random data access may impose significant time requirements on content-driven lookups. In addition, the primary index may be large, which may compound these time requirements. To address these issues, particular implementations of deduplication engines may move data that would otherwise be found only in the primary index to alternative storage locations, outside the primary index, that are physically adjacent to data blocks that are statistically more likely to have been accessed relatively recently.

During deduplication, the deduplication engine may initially look up a signature value (such as a hash value for a sub-block of data being deduplicated) in a primary index. The primary index may reference an outside storage location, such as a grouping of related sub-blocklet meta-data (which in particular embodiments may be known as a cluster header). The outside storage location may include one or more portions of the information content of the primary index. As an example and not by way of limitation, the outside storage location may include sub-block signature values and associated pointers to the data in the sub-blocks. The associated pointers may be pointers from signature values to addresses in a repository where the data in the sub-blocks is stored.

An outside storage location may include a sequential representation of sub-blocks of previously deduplicated data. If a signature of a sub-block of data currently being deduplicated is a sequential repetition of a signature of one of the sub-blocks of this previously deduplicated data, this sequential repetition may be identified to realize time or computational savings. This sequential matching may provide time or computational savings by, for example, preventing the deduplication engine from expending time or computational resources to search by random access through the primary index for the signature of the sub-block of data currently being deduplicated. Stored data may tend to be repetitive in nature, and the use of a primary index may facilitate significant overall gains in performance.

In particular embodiments, hash-based duplication is a method of data deduplication that involves segmenting data into variable or fixed-sized sub-blocks, calculating the hash of each of the sub-blocks, and matching identical sub-blocks by their hashes. U.S. Pat. No. 5,990,810, issued 23 Nov. 1999 to Ross. N. Williams, incorporated herein by reference as an example and not by way of limitation, discloses example hash-based duplication. In particular embodiments, file differencing is a method of data deduplication that involves calculating a series of fingerprints of each file and matching files based on the number of fingerprints they have in common. Once two files have been found that are similar, the old copy is read and the new copy is stored as a difference. Udi Manber, *Finding Similar Files in a Large File System*, USENIX WINTER 1994 TECHNICAL CONFERENCE PROCEEDINGS, San Francisco, Calif., Jan. 17-21, 1994, incorporated herein by reference as an example and not by way of limitation, discloses example file differencing. Herein, reference to file differencing encompasses sub-block differencing, where appropriate.

Hash-based duplication may reduce disk reads of old data, provide higher levels of deduplication, work well with compression, and facilitate the deletion of old data. However, a sub-block index used in hash-based duplication may require a large amount of memory and hash-based duplication may require distinct sub-blocks not to have the same hash. A sub-block index used in file differencing may require less memory and, since it does not rely solely on hash-based comparison, file differencing tends to be immune from hash collisions. However, in file differencing, an old copy of the file may have to be read on store to create a difference file and the old copy of the file may have to be read again on retrieve to restore the file. File differencing may make deletion of old data more difficult, since the old, unused part of an original file may not be deleted if a newer file references the same part. File differencing may make compression more difficult, since, if the original file was compressed, the original file may need to be uncompressed to create a difference file, slowing down store.

Particular embodiments combine hash-based duplication with sub-block differencing to deduplicate data. As an example and not by way of limitation, the deduplication engine may first segment data for deduplication into variable-sized sub-blocks, as U.S. Pat. No. 5,990,810 discloses. The deduplication engine may then calculate a cryptographic hash (which in particular embodiments may be known as a sub-block hash) of the sub-block and look up the sub-block in an index. If the sub-block is already present, the deduplication engine may match it and store only one unique copy. If the sub-block is not already present, the deduplication engine may identify locations in the sub-block and take cryptographic hashes (or differencing hashes) of small blocks of data in the sub-block. These small blocks of data may be approximately 10 to 1000 bytes long, depending on the size of the sub-block. To identify the locations of these small blocks of data in the sub-block, the deduplication engine may use a suitable method disclosed by Udi Manber, *Finding Similar Files in a Large File System*, USENIX WINTER 1994 TECHNICAL CONFERENCE PROCEEDINGS, San Francisco, Calif., Jan. 17-21, 1994; a suitable method disclosed by U.S. Pat. No. 5,990,810; suitable fixed offsets, such as, for example, the first n bytes of the sub-block, the last n bytes of the sub-block, and any fixed offset in between; or any suitable combination of these. In addition or as an alternative, to identify the locations of the small blocks of data in the sub-block, the deduplication engine may use a suitable version of a sub-block parser. As an example and not by way of limitation, if the parser has a parameter that dictates the mean sub-block length, the deduplication engine may re-run the parser using a shorter mean sub-block length and, instead of creating sub-block boundaries, use the location as a reference point for differencing hashes. As another example, the deduplication engine may use a single parser run to segment the data into sub-blocks and determine suitable locations for fingerprinting. For example, the parser may segment the data into approximately 16-kilobyte chunks. Every x of these chunks may then form a sub-block, and the start of every one of these chunks may be fingerprinted.

The deduplication engine may then look up these differencing hashes in the same index that stores the sub-block hashes, or an alternative index, to find similar sub-blocks. The deduplication engine may determine whether a sub-block is similar based on the number of matching differencing hashes in the sub-block. If the deduplication engine finds similar sub-blocks, it may load the contents of the old sub-blocks and store only the difference between the new sub-blocks and the old sub-blocks. If the deduplication engine does not find similar sub-blocks, it may store the differencing hashes in the same or a different index.

In particular embodiments, in comparison with hash-based duplication alone, combining hash-based duplication with sub-block differencing may reduce the size of the sub-block index. As an example and not by way of limitation, instead of indexing 10-kilobyte sub-blocks, particular embodiments may index one-megabyte sub-blocks and have 10 differencing hashes. These embodiments would use ten times fewer entries in the index and would rival space reduction for 10-kilobyte sub-blocks. In particular embodiments, in comparison with file differencing alone, combining hash-based duplication with sub-block differencing may facilitate faster matching of identical data, since the deduplication engine need not load an old copy of identical data.

Particular embodiments provide a method for backing up data that uses one scheme to deduplicate portions of data that are identical and another scheme to deduplicate portions of the data that are similar, which may facilitate more efficient use of storage and processing power.

FIG. 1 illustrates an example partitioning of data 100 into sub-blocks SB1-SB7. Although this disclosure describes and illustrates particular partitioning of particular data 100 into particular sub-blocks SB1-SB7, this disclosure contemplates any suitable partitioning of any suitable data into any suitable sub-blocks. The deduplication engine may partition data 100 into sub-blocks SB1-SB7 at boundaries BN0-BN7. Sub-block SB1 starts at boundary BN0 and ends at boundary BN1. The deduplication engine may determine which of sub-blocks SB1-SB7 are identical to each other. The deduplication engine may use signature values, such as hash values, to determine which of sub-blocks SB1-SB7 are identical to each other. In particular embodiments, the deduplication engine may use a suitable technique disclosed by U.S. Pat. No. 5,990,810 for selecting boundaries BN0-BN7.

Sub-blocks SB1 and SB5 both contain sub-block data A. They are identical to each other and, as a result, their signature values (such as hash values) will be the same. Similarly, sub-blocks SB3 and SB6 are identical to each other and their signature values are the same. None of sub-blocks SB2, SB4, and SB7 are identical to any other sub-block SB1-SB7. Sub-blocks SB2, SB4, and SB7 are non-identical sub-blocks.

Some of the non-identical sub-blocks may have portions of data that are similar to each other. Sub-block data B of sub-block SB2 includes block segments B0-B4, and sub-block data D of sub-block SB4 includes block segments B0, D1, B2, D2, B4, and D3. Sub-blocks SB2 and SB4 both include block segments B0, B2, and B4. However, sub-block SB2 does not include block segments D1, D2, and D3.

In particular embodiments, the deduplication engine uses fingerprints FP1-FP4 (which may be rabin signature values) to determine whether non-identical sub-blocks are similar. As an example and not by way of limitation, if a certain minimum percentage (such as, for example, approximately 75%) of the fingerprints associated with two non-identical sub-blocks are the same, the deduplication engine may conclude that the two non-identical sub-blocks are similar and treat them accordingly. The deduplication engine may calculate a difference between similar sub-blocks and use the difference to re-create a sub-block. In FIG. 1, sub-block data B and sub-block data D both include block segments B0, B2, and B4. In FIG. 2 (which illustrates an example combination of hash-based duplication with sub-block differencing to deduplicate data), difference 220 between sub-block data B and sub-block data D includes block segments D1, D2, and D3. Particular embodiments may use sub-block data B together with difference 220 to re-create (at block 250 in FIG. 2) sub-block data D for sub-block SB4. Particular embodiments may re-create sub-block data D for sub-block SB4 using block segments B0, B2, and B4 from sub-block data B and block segments D1, D2, and D3 from difference 220.

Although the present disclosure describes and illustrates data deduplication for purposes of backing-up data, the present disclosure contemplates any suitable uses for data deduplication. As an example and not by way of limitation, particular embodiments may use data deduplication for purposes of transmitting data or storing data that is not backed-up.

As described above, the deduplication engine may partition data 100 into sub-blocks SB1-SB7. A variable-length parser (which may be internal or external to the deduplication engine) may determine boundaries BN0-BN7. The deduplication engine may partition data 100 into sub-blocks SB1-SB7 beginning and ending, respectively, at boundaries BN0-BN7. In particular embodiments, the variable-length parser uses hash values to determine boundaries BN0-BN7.

In particular embodiments, sub-blocks SB1-SB7 are variable-length sub-blocks, which may vary in length. In particular embodiments, the mean length of sub-blocks SB1-SB7 may be in the range of approximately 16 kilobytes to approximately one megabyte. Particular embodiments assume a mean sub-block length of approximately one megabyte.

Particular embodiments may adjust the mean sub-block length based on the degree of data deduplication desired. A relatively large mean sub-block length may reduce the number of sub-blocks and therefore reduce the total amount of sub-block overhead. This may improve performance, but may reduce the space efficiency of the data deduplication. A relatively small mean sub-block length may facilitate a higher degree of data deduplication. However, a smaller mean sub-block length may require the use of more processing power, due to more boundaries BN0-BN7 and signature values being determined for the larger number of sub-blocks. Therefore, using a smaller mean sub-block length may reduce performance but increase the space efficiency of the data deduplication.

Compared with previous systems and method for data deduplication, particular embodiments may facilitate quicker matching of identical sub-blocks by comparing their hash values using an index of hash values. In particular embodiments, if larger sub-blocks are used (which may reduce data deduplication), more fingerprints may be used to determine whether non-identical sub-blocks are "similar." Particular embodiments apply one or more suitable differencing techniques to these similar sub-blocks. The differencing techniques used may depend on the underlying data type.

Particular embodiments use a set of one or more hash values to uniquely identify sub-block data A-E in sub-blocks SB1-SB7. As an example and not by way of limitation, assume that sub-blocks SB1 and SB5 (which both include sub-block data A) result in the hash value "a"; sub-block SB2 (which includes sub-block data B) results in the hash value "b"; sub-blocks SB3 and SB6 (which both include sub-block data C) result in the hash value "c"; sub-block SB4 (which includes sub-block data D) results in the hash value "d"; and sub-block SB7 (which includes sub-block data E) results in the hash value "e." As the deduplication engine deduplicates data 100, the deduplication engine may associate the hash values a-e with an index 230.

When the deduplication engine hashes the sub-block data in a sub-block, the deduplication engine may look up the hash value in index 230. If index 230 already includes that hash value, then, the deduplication engine may determine that the signature value of that sub-block is identical to the signature value of another sub-block that the deduplication engine has already processed. The deduplication engine may process the sub-block and then "associate" its hash value with an index (such as index 230) that holds hash values. As an example and not by way of limitation, when the deduplication engine processes sub-block data A for sub-block SB1 having the hash value "a," the deduplication engine may associate the hash value "a" with index 230. The deduplication engine may process sub-block data A for sub-block SB5, which also has a hash value of "a." The deduplication engine may look up the hash value of sub-block SB5 in index 230 during the processing of sub-block SB5. Because the hash value of sub-block SB1 is already "associated" with index 230 and matches the hash value of sub-block SB5, the deduplication engine may determine that sub-blocks SB1 and SB5 have identical signature values.

Although the present disclosure describes and illustrates determining whether sub-blocks are identical by looking up corresponding hash values in an index, the present disclosure contemplates any suitable method for determining whether sub-blocks are identical (as an alternative or in addition to determining whether sub-blocks are identical by looking up corresponding hash values in an index). As an example and not by way of limitation, the deduplication engine may compare data associated with the sub-blocks to determine whether they are identical. More specifically, the deduplication engine may for example compare sub-block data A in sub-block SB1 with sub-block data A in sub-block SB5.

In particular embodiments, the deduplication engine also determines whether non-identical sub-blocks are similar. As an example and not by way of limitation, consider sub-blocks SB2 and SB4. Sub-block SB2 includes block segments B0-B4. Sub-block SB4 includes block segments B0, D1, B2, D2, B4, and D3. Sub-blocks SB2 and SB4 both include block segments B0, B2, and B4. However, sub-block SB2 does not include block segments D1, D2, and D3. In particular embodiments, the deduplication engine may use fingerprints FP1-FP4 to determine whether non-identical sub-blocks are "similar." In particular embodiments, the deduplication engine may treat two non-identical sub-blocks as "similar" if a certain minimum percentage (such as, for example, at least approximately 75%) of the fingerprints associated with them are the same. The deduplication engine may calculate a difference between similar sub-blocks and use the difference later to re-create one or both of the sub-blocks. In particular embodiments, storing the difference between two similar sub-blocks (instead of storing the entire new version of the new sub-block) reduces the storage space required or used.

As described above, sub-block data B and sub-block data D in sub-blocks SB2 and SB4 both include block segments B0, B2, and B4. Difference 220 between sub-block data B and sub-block data D includes block segments D1, D2, and D3. In particular embodiments, the deduplication engine may use sub-block data B together with difference 220 to re-create (at block 250 in FIG. 2) sub-block data D for sub-block SB4. The deduplication engine may re-create sub-block data D for sub-block SB4 can be using block segments B0, B2, and B4 in sub-block data B and block segments D1, D2, and D3 in difference 220.

Particular embodiments use fingerprints FP1-FP4 to determine whether non-identical sub-blocks are similar. Fingerprints FP1-FP3 are associated with sub-block SB2 and fingerprints FP1, FP2, and FP4 are associated with sub-block SB4. Particular embodiments may use a cryptographically secure hash algorithm (such as, for example, Secure Hash Algorithm-1 (SHA-1)) to generate fingerprints FP1-FP4, making them "strong" hashes or cryptographic sums of portions of data that start at interesting locations. In particular embodiments, a hash from a non-cryptographically secure hashing algorithm (such as, for example, a rolling hash) is a "weak" hash.

In particular embodiments, when the deduplication engine takes a fingerprint at an interesting location, the deduplication engine stores it in fingerprint index 235. The deduplication engine may look up any subsequently taken fingerprints in fingerprint index 235 to determine if they are identical. Fingerprint index 235 may be associated with index 230 according to the relationship of fingerprints FP1-FP4 to the hash values at interesting locations IL1-IL6 in FIG. 1. As an example and not by way of limitation, fingerprint index 235

(which may include FP1) may include an indicator indicating that FP1 is linked to the hash value "a" of sub-block data B in sub-block SB2. In particular embodiments, fingerprint index 235 and index 230 are coupled with each other. In particular embodiments, index 230 includes an indexing of fingerprints along with an indexing of hash values. Although the present disclosure describes and illustrates a particular arrangement of index 230 and fingerprint index 235, the present disclosure contemplates any suitable arrangement of index 230 and fingerprint index 235. As an example and not by way of limitation, in particular embodiments, fingerprint index 235 need not be coupled to index 230.

In particular embodiments, the deduplication engine performs two hashes. As en example and not by way of limitation, the deduplication engine may use a first hash (such as, for example, a rolling hash) to identify an interesting location. When the deduplication engine has found the interesting location, the deduplication engine may use a strong hash to take a fingerprint of the data at, before, or after the interesting location (which may, for example, be in the range of 10 bytes to one kilobyte in length). In FIG. 1, the deduplication engine has identified interesting locations IL1, IL2, and IL3 (which are associated with sub-block SB2 and sub-block data B) and interesting locations IL4, IL5, and IL6 (which associated with sub-block SB4 and sub-block data B). The deduplication engine may then take fingerprints of the data at these interesting locations. In FIG. 1, the deduplication engine has taken fingerprints as follows: fingerprint FP1 at interesting location IL1; fingerprint FP2 at interesting location IL2; fingerprint FP3 at interesting location IL3; fingerprint FP1 at interesting location IL4; fingerprint FP2 at interesting location IL5; and fingerprint FP4 at interesting location IL6.

In particular embodiments, sub-blocks are similar if at least a minimum percentage of their respective fingerprints are the same. As an example and not by way of limitation, the deduplication engine may consider sub-blocks to be similar if at least 75% of their fingerprints are the same. In particular embodiments, this percentage is adjustable. In particular embodiments, this percentage may be anywhere between 25% and 90%. In FIG. 1, sub-blocks SB2 and SB4 have two out of three of their respective fingerprints that are the same (fingerprints FP1 and FP2). Since at least 75% of their signature values are the same, the deduplication engine may consider sub-blocks SB2 and SB4 to be similar. The percentage may be adjusted to provide a desired amount of deduplication, to accommodate an available storage, or to accommodate available processing power or for any other suitable reason.

The present disclosure contemplates any suitable method for determining any suitable interesting location. As an example and not by way of limitation, particular embodiments may use a rolling hash. Particular embodiments may use fixed offsets to determine interesting locations. Particular embodiments may use the beginnings and ends of sub-blocks as interesting locations. Particular embodiments may use a fixed offset that is in between the beginning and the end of a sub-block as an interesting location. Particular embodiments may use a combination of these or any other suitable methods to determine interesting locations.

Herein, reference to sub-blocks that are non-identical and dissimilar encompasses sub-blocks that are not identical and not similar, where appropriate.

FIG. 3 illustrates an example system 300 for deduplicating data that combines hash-based duplication with sub-block differencing. System 300 includes a client 302, a deduplication engine 305, and a data store (or repository) 308. One or more links 309 couple client 302 to data store 308, and one or more links 309 couple deduplication engine 305 to data store 308. In particular embodiments, one or more links 309 each include one or more buses, wireline links, wireless links, or optical links. In particular embodiments, one or more links 309 each include a virtual private network (VPN), a local area network (LAN), a wireless LAN (WLAN), a wide area network (WAN), a metropolitan area network (MAN), a portion of the Internet, or another link 309 or a combination of two or more such links 309. In particular embodiments, a link 309 may include one or more links 309. The present disclosure contemplates any suitable links 309. One or more links 309 coupling client 302 to data store 308 may differ in one or more respects from one or more links 309 coupling deduplication engine 305 to data store 308. Although this disclosure describes and illustrates a particular arrangement among a particular client 302, a particular deduplication engine 305, a particular data store 308, and particular links 309, this disclosure contemplates any suitable arrangement among any suitable client 302, any suitable deduplication engine 305, any suitable data store 308, and any suitable links 309. As an example and not by way of limitation, instead of or in addition to one or more links 309 coupling client 302 to data store 308, one or more links 309 may couple client 302 to deduplication engine 305. Client 302, deduplication engine 305, and data store 308 may be located at a single physical location or at multiple physical locations.

As described above, deduplication engine 305 may include a hardware or software element (such as, for example, a computer program) or a combination of two or more such elements that algorithmically perform data deduplication. This disclosure contemplates any suitable programming language for any suitable computer program for data deduplication, where appropriate. This disclosure contemplates any suitable number and type of computer systems executing any suitable computer program for data deduplication, where appropriate. Each of the computer systems may be unitary or distributed, where appropriate, and a distributed computer system may span multiple computer systems or multiple datacenters, where appropriate. Deduplication engine 305 may include one or more deduplication engines 305.

In particular embodiments, deduplication engine 305 provides in-line deduplication. As an example and not by way of limitation, deduplication engine 305 may deduplicate data 100 from client 302 as client 302 or another device stores data 100 at data store 308, which may provide back-up or other storage for client 302. In particular embodiments, deduplication engine 305 provides post-process deduplication in addition or as an alternative to in-line deduplication. As an example and not by way of limitation, deduplication engine 305 may access data 100 stored at data store 308 (which client 302 or another device may have stored at data store 308 without having data deduplication performed on it) and then deduplicate and re-store it. In particular embodiments, deduplication engine 305 may assist in re-creating data 100 stored at data store 308 when client 302 accesses it.

In particular embodiments, deduplication engine 305 includes a data-partitioning module 310, an identical sub-block module 320, a similar sub-block module 330, and a differencing module 345. Data-partitioning module 310, identical sub-block module 320, similar sub-block module 330, and differencing module 345 may each include a hardware or software element or a combination of two or more such elements that provide particular functionality for data deduplication. In particular embodiments, data-partitioning module 310 partitions data (such as, for example, data 100) into sub-blocks (such as, for example sub-blocks SB1-SB7) and creates fingerprints (such as, for example, fingerprints FP1-FP4). In particular embodiments, identical sub-block module 320 determines whether a sub-block is identical to one or more other sub-blocks. In particular embodiments, similar sub-block module 330 determines whether a sub-block is similar to one or more other sub-blocks. In particular embodiments, differencing module 340 calculates differences between sub-blocks that are similar to each other.

In particular embodiments, data-partitioning module 310, identical sub-block module 320, similar sub-block module 330, and differencing module 345 are functionally, logically, or physically separate from each other. As an example and not by way of limitation, data-partitioning module 310 may have its own hardware or software elements, distinct from those of each of identical sub-block module 320, similar sub-block module 330, and differencing module 345. In particular embodiments, two or more of data-partitioning module 310, identical sub-block module 320, similar sub-block module 330, and differencing module 345 are functionally, logically, or physically combined with each other, where appropriate. As an example and not by way of limitations, two or more of data-partitioning module 310, identical sub-block module 320, similar sub-block module 330, and differencing module 345 may share one or more of their hardware or software elements with each other.

Data-partitioning module 310, identical sub-block module 320, similar sub-block module 330, and differencing module 345 may access (e.g. write to or read from) deduplication-engine data 350 as needed to provide their functionality. Deduplication-engine data 350 may include one or more differences calculated between similar sub-blocks (such as, for example, difference 220 between sub-block data B and sub-block data D), one or more indexes (such as, for example, index 230 and fingerprint index 235), and other suitable deduplication-engine data 350. One or more portions of deduplication-engine data 350 may be internal to deduplication engine 305, where appropriate. One or more portions of deduplication-engine data 350 may be external to deduplication engine 305, where appropriate. This disclosure contemplates deduplication-engine data 350 being stored in any suitable manner using any suitable memory.

Figure 4:
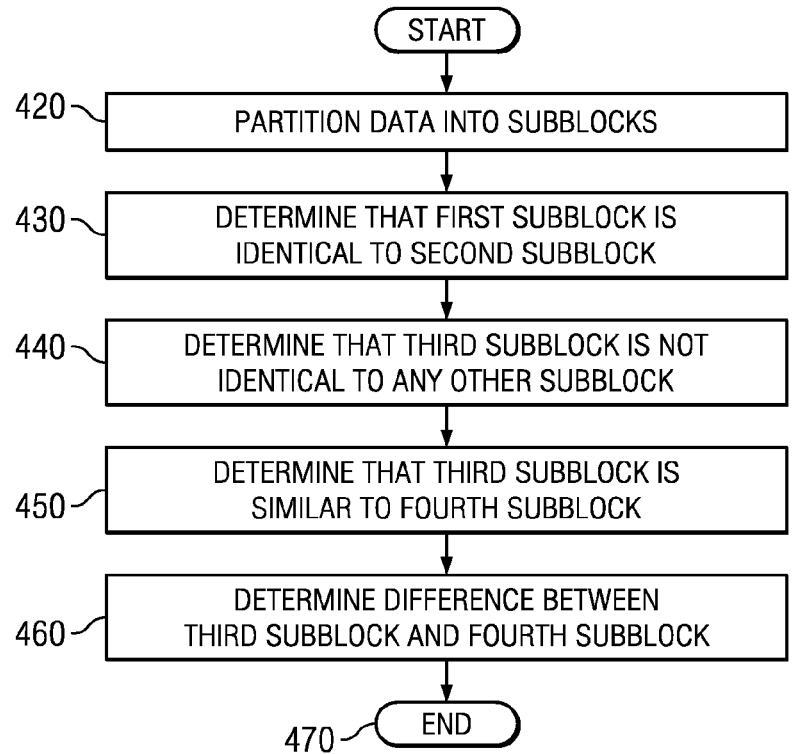
FIG. 4 illustrates an example method for deduplicating data that combines hash-based duplication with sub-block differencing.

FIG. 4 illustrates an example method for deduplicating data that combines hash-based duplication with sub-block differencing. The method starts at step 420, where data-partitioning module 310 partitions data 100 into sub-blocks SB1-SB7 beginning and ending at boundaries BN0-BN7. At step 430, identical sub-block module 320 determines that a first one (such as, for example, sub-block SB1) of sub-blocks SB1-SB7 is identical to a second one (such as, for example, sub-block SB5) of sub-blocks SB1-SB7. If the first one of sub-blocks SB1-SB7 is identical to another one of sub-blocks SB1-SB7, deduplication engine 305 stores a hash of the first one of sub-blocks SB1-SB7 in index 230. As an example and not by way of limitation, identical sub-block module 320 may determine the hash value "a" for the sub-block SB1. Identical sub-block module 320 may then determine the hash value for a second sub-block, such as sub-block SB5. Identical sub-block module 320 may look up the hash value for sub-block SB5 in index 230 to determine whether an identical value to the hash value for sub-block SB5 is already stored in index 230. If identical sub-block module 320 finds an identical hash value in index 230, identical sub-block module 320 may conclude that sub-blocks SB1 and SB5 are identical. Sub-blocks SB1 and SB5 both include sub-block data A that hashes to the same hash value "a." Therefore, the hash values "a" for sub-blocks SB1 and SB5 are the same, which indicates that sub-block data A for sub-blocks SB1 and SB5 are identical. Deduplication engine 305 may repeat this process for sub-blocks in data 100 to identify "identical" hash values and, thus, identical sub-blocks. In particular embodiments, this process of identifying "identical" hash values includes storing in index 230 hash values for all or some sub-blocks of data 100.

By determining that the first and second ones of sub-blocks SB1-SB7 are identical, particular embodiments provide a higher degree of deduplication. Storing relatively large sub-blocks may work well with compression and may facilitate the deletion of the sub-block data of those sub-blocks.

At step 440, identical sub-block module 302 determines that a third one (such as, for example, sub-block SB2) of sub-blocks SB1-SB7 is not identical to any other ones of sub-blocks SB1-SB7. (The hash values for the sub-blocks being compared at step 440 may be determined and stored in index 230 at step 430 or step 440 so that identical characteristics of the sub-blocks of interest at step 440 may be determined.) As an example and not by way of limitation, identical sub-block module 320 may determine whether index 230 does not include the hash values for sub-blocks SB2, SB4, and SB7. Identical sub-block module 320 may look up in index 230 the hash value "b" for sub-block data B of sub-block SB2. Index 230 may not include the hash value "b," and identical sub-block module 320 may conclude that deduplication engine 305 has not encountered an identical sub-block for sub-block data B.

At step 450, similar-sub-block module 330 determines that the third one (such as, for example, sub-block SB2) of sub-blocks SB1-SB7 is similar to a fourth one (such as, for example, sub-block SB4) of sub-blocks SB1-SB7. (The hash values for these sub-blocks may be determined and stored in index 230 at step 420, 430, or 450.) As an example and not by way of limitation, similar sub-block module 330 may determine interesting locations IL1-IL6 for sub-blocks SB2 and SB4. Because deduplication engine 305 stores sub-block SB2 before it stores sub-block SB4, sub-block SB4 may have a link to sub-block SB2. Deduplication engine 305 may store difference 220 between sub-blocks SB2 and SB4 with sub-block SB4. Deduplication engine 305 may increment a reference count of sub-block SB2 indicate that sub-block SB2 is similar to sub-block SB4. In particular embodiments, deduplication engine 305 stores with a sub-block the difference associated with the sub-block. As an example and not by way of limitation, deduplication engine 305 may store difference 220 with sub-block SB4. Assume that the difference between sub-blocks SB10 and SB11 is "x"; the difference between sub-blocks SB12 and SB13 is "y"; deduplication engine 305 processes sub-block SB10 before sub-block SB11; and deduplication engine 305 processes sub-block SB12 before sub-block SB13. Deduplication engine 305 may store sub-blocks SB10 and SB12 in their entirety and increment reference counts for sub-blocks SB10 and SB12. Deduplication engine 305 may store the difference "x" with sub-block SB11 and store the difference "y" with sub-block SB13.

By determining that the third one of sub-blocks SB1-SB7 (which is not identical to any other ones of sub-blocks SB1-SB7) is similar to a fourth one of sub-blocks SB1-SB7, deduplication engine 305 may store difference 220 (D1, D2, and D3) between the third and fourth ones of sub-blocks SB1-SB7. In particular embodiments, storing difference 220 may use less storage than storing both of the third and fourth ones of sub-blocks SB1-SB7 in their entirety. In particular embodiments, storing difference 220 may reduce the occurrence of hash collisions.

At step 460, differencing module 345 determines a difference between the third one (such as, for example, sub-block SB2) of sub-blocks SB1-SB7 and the fourth one (such as, for example, sub-block SB4) of sub-blocks SB1-SB7, which the third one is similar to, at which point the method ends. As an example and not by way of limitation, differencing module 345 may determine that difference 220 between sub-blocks SB2 and SB4 is D1, D2, and D3. In particular embodiments, differencing module 345 is a part of a differencing mechanism. In particular embodiments, a differencing mechanism is a part of differencing module 345. In particular embodiments, a differencing mechanism is separate from but communicatively coupled to differencing module 345.

Although this disclosure describes and illustrates particular steps of the method of FIG. 4 as occurring in a particular order, this disclosure contemplates any suitable steps of the method of FIG. 4 occurring in any suitable order. Although this disclosure describes and illustrates particular components carrying out particular steps of the method of FIG. 4, this disclosure contemplates any suitable components carrying out any suitable steps of the method of FIG. 4.

In particular embodiments, deduplication engine 305 or another device may use sub-block data B of sub-block SB2 together with difference 220 to re-create (at block 250 in FIG. 2) sub-block data D associated with sub-block SB4. In FIG. 1, sub-block SB2 includes sub-block data B (which includes block segments B0-B4) and sub-block SB4 includes sub-block data D (which includes block segments B0, D1, B2, D2, B4, and D3). Deduplication engine 305 or another device may use block segments B0, B2, and B4 from sub-block SB2 together with block segments D1, D2, and D3 from difference 220 to re-create (at block 250 in FIG. 2) sub-block data D for sub-block SB4.

In particular embodiments, to re-create sub-blocks SB1-SB6, deduplication engine 305 or another device may use sub-block data A of identical sub-blocks SB1 and SB5; sub-block data C of identical sub-blocks SB3 and SB6; sub-block data B and sub-block D of similar sub-blocks SB2 and SB4; and difference 220. The use of both deduplicating portions of data 100 that are identical (such as, for example, sub-block data A of sub-blocks SB1 and SB5 and sub-block data C of sub-blocks SB3 and SB6) and deduplicating portions of data 100 that are similar (such as, for example, sub-block data B and sub-block D of sub-blocks SB2 and SB4) facilitates the transformation of data 100 into deduplicated data. In particular embodiments, deduplication engine 305 may transform the deduplicated data to re-create (at block 250 in FIG. 2) data 100. In particular embodiments, deduplication engine 305 may store a deduplicated version of data 100 in electronic memory as a backup for purposes of re-creating the original version of data 100.

Although this disclosure describes and illustrates similarities and differences between two sub-blocks, this disclosure contemplates similarities and differences between or among any suitable number of sub-blocks. Although this disclosure describes and illustrates similar sub-blocks (such as, for example, sub-blocks SB2 and SB4) not being identical to any other sub-blocks (such as, for example, any other ones of SB1-SB7), this disclosure contemplates deduplicating any combination of identical or similar sub-blocks. As an example and not by way of limitation, a sub-block SB20 may contains sub-block data that is not similar enough to sub-block data of sub-block SB21 or sub-block SB22 individually, but may contain sub-block data that is similar to the set of sub-block SB21 and sub-block SB22. If sub-blocks SB21 and SB22 are contiguous, sub-block SB20 may contain sub-block data that overlaps the sub-block data of the set of sub-blocks SB21 and SB22. Particular embodiments may match sub-blocks that are similar to sets of sub-blocks, in addition or as an alternative to individual sub-blocks.

Particular embodiments facilitate quick matching of data for deduplication purposes, while also increasing sub-block size, thereby facilitating faster running of a deduplication engine. In particular embodiments, identical sub-blocks are matched without having to read their data off a disk and similar sub-blocks are matched using differencing techniques. Portions of the data that are identical and portions of the data that are similar are then deduplicated. Particular embodiments facilitate increasing the amount of matching for deduplication while at the same time reducing the need to read data off disks or to store data, thereby increasing efficiency and saving resources.

In particular embodiments, using identical sub-blocks to deduplicate as many identical sub-blocks as possible reduces the number of times that a sub-block needs to be retrieved from storage to determine a difference between that sub-block and another sub-block. In particular embodiments, storing identical sub-blocks facilitates deleting and compressing their data. Deleting data associated with a sub-block that is stored in the form of a difference may be more difficult.

In particular embodiments, combining the processing of identical sub-blocks with the processing of similar sub-blocks may facilitate increasing the mean length of sub-blocks. Increasing the mean length of sub-blocks may facilitate more efficient use of storage and processing power. Less storage and processing power may be needed to store larger sub-blocks. In particular embodiments, combining the processing of identical sub-blocks with the processing of similar sub-blocks may reduce the size of an index (such as, for example, index 230) used in data deduplication. Particular embodiments store signature values an index that is coupled with or the same index as index 230. As an example and not by way of limitation, deduplication engine 305 may store ten fingerprints and one hash for each sub-block. This may amount to 11 indexed entries per megabyte. Index 230 may have ten times fewer entries than an index that indexes sub-blocks with a mean length of four to 16 kilobytes.

Figure 5:
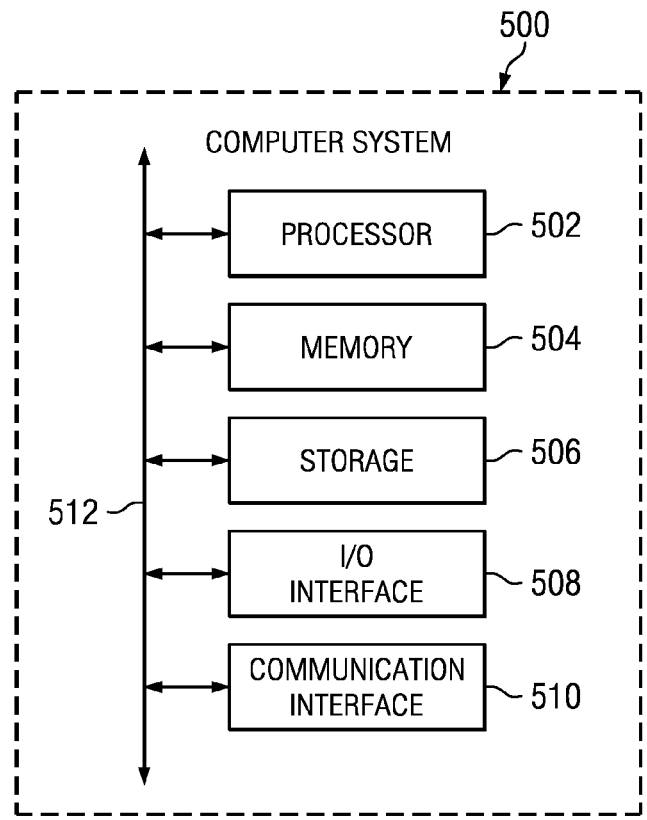
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. The present disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. The present disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The invention claimed is:

1. A method comprising, by one or more computer systems:
   partitioning data into a plurality of variable-sized sub-blocks;
   computing a cryptographic hash for a member of the plurality of sub-blocks, where the cryptographic hash is computed from all the data in the member; and
   upon determining that the member is not identical to a sub-block stored in a data de-duplication system based, at least in part, on the cryptographic hash;
   computing an additional hash for the member, where the additional hash is computed from less than all the data in the member; and
   determining whether the sub-block is similar to another sub-block stored in the data de-duplication system based, at least in part, on the additional hash.

2. The method of claim 1, comprising computing a plurality of additional hashes for the member, where the additional hashes are computed from less than all the data in the member, and where the additional hashes are computed from different subsets of data in the member.

3. The method of claim 2, comprising determining whether the sub-block is similar to another sub-block stored in the data de-duplication system based, at least in part, on the plurality of additional hashes.

4. The method of claim 3, where determining whether the sub-block is similar to another sub-block comprises comparing the plurality of additional hashes computed for the member to a plurality of additional hashes available for the other sub-block.

5. The method of claim 4, where the sub-block is determined to be similar to the other sub-block when more than a threshold number of the plurality of additional hashes computed for the member match members of the plurality of additional hashes available for the other member.

6. The method of claim 5, comprising storing the member in the data de-duplication system using sub-block differencing.

\* \* \* \* \*

UNITED STATES PATENT AND TRADEMARK OFFICE
CERTIFICATE OF CORRECTION

PATENT NO.        : 8,442,942 B2                                    Page 1 of 1
APPLICATION NO.   : 12/731590
DATED             : May 14, 2013
INVENTOR(S)       : Andrew C. Leppard It is certified that error appears in the above-identified patent and that said Letters Patent is hereby corrected as shown below:

In the Specifications

In column 7, line 14 delete "en" and insert --an--.

In column 10, line 40 delete "indicate" and insert --indicating--.

In column 12, line 31 delete "values an" and insert --values in an--.

In column 14, line 14 delete "appropriate Where" and insert --appropriate. Where--.

Signed and Sealed this
Eleventh Day of March, 2014

Michelle K. Lee
*Deputy Director of the United States Patent and Trademark Office*